Patented May 3, 1949

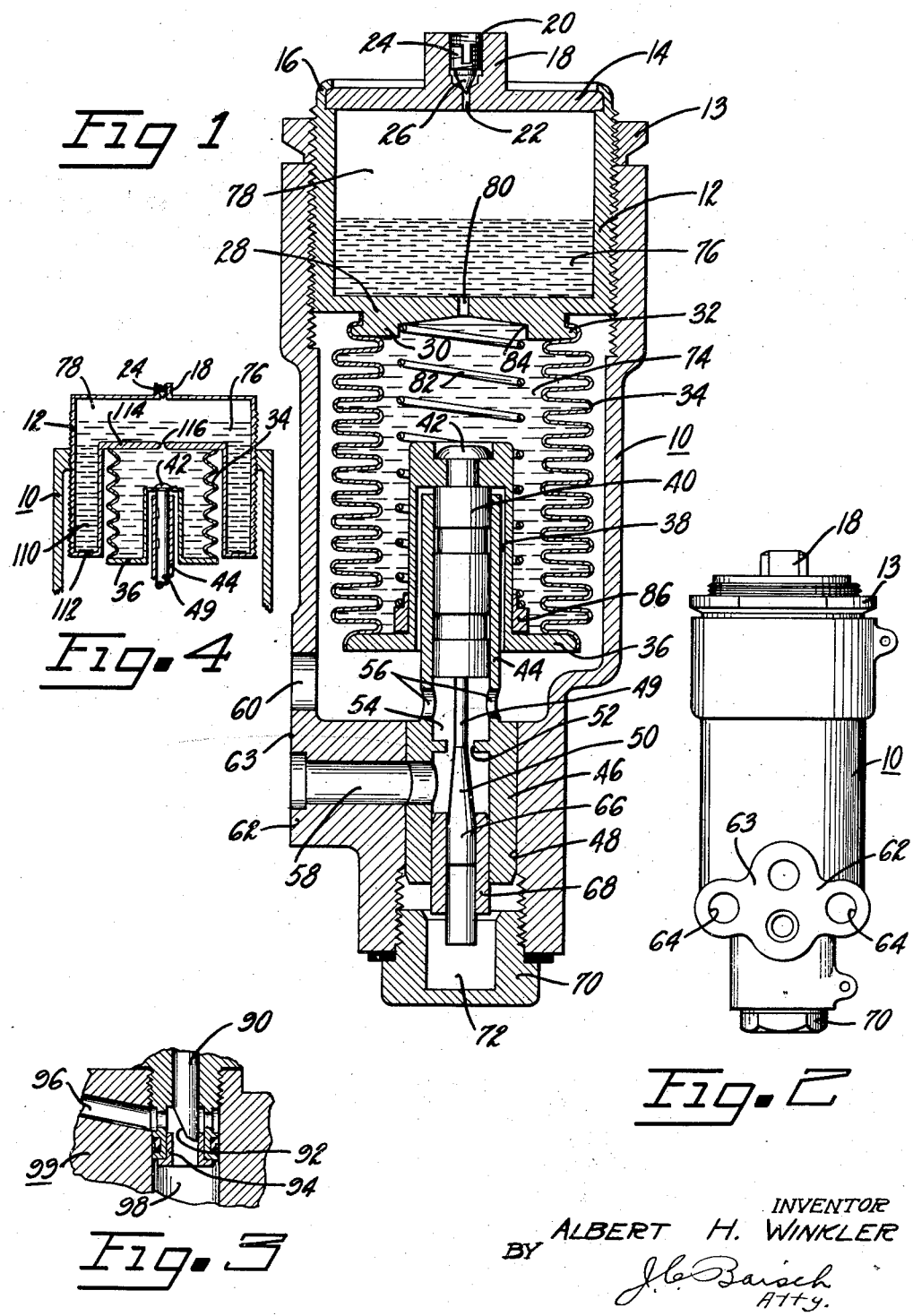

2,469,038

UNITED STATES PATENT OFFICE 2,469,038

PRESSURE RESPONSIVE VALVE MECHANISM

Albert H. Winkler, South Bend, Ind., assignor to Bendix Aviation Corporation, South Bend, Ind., a corporation of Delaware Application December 17, 1943, Serial No. 514,651

6 Claims. (Cl. 236—92)

This invention relates to pressure sensitive mechanism, and particularly to corrugated metal bellows of the type used to control a device (such as a valve or a switch) as a function of pressure changes either on the exterior or on the interior of the bellows, or as a function of temperature changes to which the unit is subjected, or as a correlated function of both temperature and pressure changes to accomplish density responsiveness.

Devices of this type are particularly useful in carburetors for internal combustion engines, particularly aircraft engines, to control carburetor elements in response to variations in the pressure, temperature, or density of one of the working fluids whereby the richness of the mixture supplied to the engine is modified.

However, where such a device is used in an installation where it is subjected to vibration, as on an aircraft motor, it is found that its life is shortened because the vibrations set up sympathetic vibrations in the bellows which fatigue the metal of the walls until failure occurs by fracture of said walls.

A bellows of this type usually comprises a flexible corrugated cylindrical wall which may be at least partly filled with an oil that will remain fluid over the operating range to aid in damping vibrations, a base which is relatively fixed and a relatively free end which is connected to the controlled member, which may be a valve, an electric switch, or any device capable of being controlled by the movement of the bellows. The flexible wall may be elongated or compressed, or may be bent into the arc of a circle, without putting undue strain on said wall and it is necessary that the bellows expand and contract to effect operative movements of the valve member or other device to which it is connected. Further it is desirable that the bellows be free to bend laterally slightly to accommodate slight misalignments thereof with the valve member such as may occur in manufacture or assembly of the parts or by displacement thereof in use.

Devices of this character have been proposed with a central member which extends longitudinally within the bellows in close proximity with the inner parts of the corrugations of the bellows wall to provide restrictions between said member and said parts of the corrugations for restricting the flow of the oil therein and aid in the damping of vibrations of the bellows. However, it has been found that such an arrangement is not entirely satisfactory as clearances between the inner parts of the corrugations and the central member must be very small and it is extremely difficult to accurately manufacture such a device with the proper clearances. In such an arrangement it has also been found that air bubbles often form in the pockets between the corrugations and the air is forced through the restrictions between said central member and the inner part of the corrugations, in which event the damping effectiveness of the structure is impaired or lost. A further disadvantage of such an arrangement is that the bellows cannot bend or curve laterally sufficiently to accommodate misalignment between the bellows and the moveable valve member such as may occur in manufacturing of the assembly or of the parts thereof or by displacement thereof in use. Should such misalignment occur the central member is apt to contact the inner parts of the corrugations and cause such binding as to impair or destroy the operation of the bellows.

Another arrangement for damping vibrations in bellows of the above character has been proposed and includes a piston type of dashpot arrangement. However, such an arrangement may reduce the effectiveness and accuracy of the device due to the friction between the piston and cylinder within which it operates.

It is therefore an important object of the invention to provide a device wherein the foregoing disadvantages are eliminated.

It is another important object of the instant invention to eliminate or reduce vibration and undue stress in apparatus of this type, so as to improve the operation and lengthen the life of the apparatus.

Further objects of the invention are to provide novel damping means in association with the bellows and an improved guide means for the free end of the bellows and the valve actuated thereby; to provide an improved construction whereby apparatus of this type will function accurately and dependably under exacting requirements; to provide a device of this character which will accurately maintain its calibration over long periods of service and will respond to variations in the density of the air surrounding the bellows irrespective of whether the change in density results from a change in the temperature or pressure of the surrounding air; to provide a device of this character having a liquid reservoir for supplying liquid to the interior of the bellows and having a calibrated restriction or orifice between the reservoir and the bellows chamber so that the damping liquid will have to flow through the restriction to allow the bellows chamber to change volume, the reservoir being disposed above the bellows and only partially filled with liquid and having a gas space above the liquid level thereby permitting expansion and contraction of the bellows; to provide yielding means, such as a spring, to modify the rate of the bellows so that the rate of the device is based on the rate of the bellows as thus modified by the spring; and to provide a device of this character wherein novelty resides in various details of construction and arrangements and combinations of parts.

Still another object of the invention is to provide a device of this character wherein its effectiveness thereof will be substantially unaffected by inversion thereof.

Still other objects of the invention are to provide a simplified device of this character which may be built at reasonable cost and which is sturdy and reliable in operation; to provide a device that will accommodate slight misalignments between the bellows and moveable valve member; and that will eliminate the use of friction producing parts such as dashpot pistons.

Other objects and advantages of the invention will be readily apparent to those skilled in the art from the following description taken in connection with the accompanying drawing which represents a preferred embodiment. After considering this embodiment skilled persons will understand that many variations may be made without departing from the principles disclosed; and I contemplate the employment of any structures, arrangements, or modes of operation that are properly within the scope of the appended claims.

In the drawing:

Figure 1 is a longitudinal section taken through a device embodying the invention, the arrangement being shown diagrammatically;

Figure 2 is a reduced side elevation of the same;

Figure 3 is a partial section diagrammatically showing a modified type of valve which may be actuated by a bellows; and Figure 4 is a diagrammatic, partial section of a device embodying a modification of the invention.

Referring more particularly to Figures 1 and 2 the device disclosed therein comprises a generally cylindrical casing 10 the upper end of which is internally threaded to receive an externally threaded cup member 12 which constitutes a reservoir for oil or other liquid and a gas as will be hereinafter described, said reservoir being locked in position by a lock nut 13. The upper end of the member or reservoir 12 is closed by a wall 14 which is secured in position by the over turned portion of a longitudinally extending flange 16. The wall 14 is provided with a longitudinal extension 18 provided with a threaded passage 20 and a passage 22 of reduced size connected therewith, the passage 20 being normally closed by a screw 24 having a tapered valve-like end 26 for normally sealing the passage 22. This arrangement is provided to permit filling of the reservoir and evacuation thereof. The outer configuration of the extension 18 may be hexagonal or otherwise formed so that a wrench or other instrument may be attached thereto for rotating the reservoir in the casing 10. The lower end of the reservoir 12 is closed by an integral wall 28 having a depending extension 30 including an annular flange 32 adjacent the lower end to which a corrugated flexible metallic bellows 34 of known type is secured and held in fixed position. The lower end of the bellows is closed by a plate member 36 having a hollow cylindrical portion 38 which extends axially into the interior of the bellows, the portion 38 having an outside diameter substantially less than the diameter of the interior of the bellows so that it will not come into contact with the inner walls of the corrugations of the bellows and interfere with the movements of the latter upon curving or other misalignment thereof. A valve member 40 is secured to the upper end of the cylindrical portion 38, as by riveting at 42, so that said valve member moves with movements of the free or lower end of the bellows. Guide means is provided for the valve member 40 and comprises a bushing 44 which extends upwardly into the cylindrical member 38 in spaced relation thereto and includes an enlarged portion 46 adjacent the lower end which is pressed into a bore 48 in the lower end of the casing 10. The valve member 40 is adapted to slide within the upper end of the guide and is provided with a depending valve stem 49 having a tapered portion 50 adapted to coact with a valve seat 52 for controlling a fluid passage 54 in the guide member 44, said fluid passage 54 being connected with the interior of the casing 10 by orifices 56 above the valve seat and having a connection below the valve seat with a passage 58. The passage 58 and a passage 60 communicating with the interior of the casing 10 have their outer ends terminating in a lateral extension 62 which is provided with a flat surface 63 whereby the device may be attached to a carburetor or other device, the passages 58 and 60 being adapted to register with corresponding passages of said carburetor or other device. Screw holes 64 are provided for said attachment. The valve stem is provided with a cylindrical portion 66 below the tapered portion 50 and said cylindrical portion is adapted to slide within a guide or bushing 68 pressed into the lower end of the passage 54 of the guide 44. A nut 70 closes the lower end of the bore 48 and is provided with a recess 72 which accommodates the lower cylindrical portion 66 of the valve stem as the valve moves in the opening direction. Adjustment of the valve member 40 relative to the seat 52 is effected by screwing the reservoir 12 inwardly or outwardly relative to the casing.

The interior of the bellows and the lower portion of the reservoir 12 is provided with a body of oil 74, 76 respectively, of suitable and relatively constant viscosity, there being a space 78 for gas above the oil level in the reservoir to permit the bellows to function, as explained hereinafter, and a calibrated restriction 80 for the passage of oil between the bellows and reservoir. It is to be understood however that if desired more than one restricted passage may be provided between the bellows and reservoir. By regulating the volume of the space 78 above the oil level and the size of the orifice 80 the sensitivity of the valve movement for given pressure changes may be conveniently regulated. Furthermore, the sensitivity of the bellows to changes in temperature may be regulated by controlling the absolute pressure within the bellows and reservoir 12 at the time of sealing same, it being not responsive to temperature changes if the space is entirely evacuated and becoming increasingly responsive to temperature changes as the absolute pressure within the bellows is increased. By correlating the volume of this space and its absolute pressure at the time of sealing it is possible to obtain a device which will respond accurately to changes in air density irrespective of whether the change results from change in air temperature or change in air pressure. It will be readily apparent that the bellows will tend to collapse as the space 78 is evacuated. The natural elasticity of the bellows will tend to resist such collapses due to evacuation; however if the degree of evacuation is high it may be desirable or even necessary to use a compression spring, such as spring 82 within the bellows to assist in resisting the collapsing action due to evacuation. Other spring arrangements to modify the action of the bellows may also be used as by having the spring in series with the bellows or opposed. The spring 82, as shown, has its upper end received in a spring retaining cavity 84 and reacts against the wall 28, its lower end being disposed about a spring retaining member 86 disposed about the cylindrical portion 38 whereby pressure is exerted against the plate 36. The spring 82 functions in parallel with the resilient bellows 34 and the total rate of the device is the sum of that of said spring and bellows.

If the space 78 above the oil is filled with air, it has been found that the valve setting or calibration of the unit will change with use as the oxygen in the air combines with the oil, thus changing the effective internal pressure. Such a change in the internal pressure also disturbs the correlation between the pressure and the temperature responsiveness necessary for accurate density combination. By using nitrogen within the bellows it has been found that the unit will maintain its calibration over long periods of use. Other inert gases having no tendency to combine with the oil and substantially no tendency to dissolve in the oil may also be used, gases having such characteristics being herein designated as inert gases.

In certain types of bellows, even those having liquid therein, vibrations commonly cause surging of fluid within the bellows assembly resulting in faulty mixture control. With the present device such surging is reduced to a minimum or eliminated entirely by employing the calibrated restriction 80 connecting the interior of the bellows with the reservoir. The size of the calibrated orifice 80 determines the characteristics of the damping effect. For example, if it is desired to increase the damping effect of the oil the size of the orifice 80 is reduced thus forming a more limited area between the interior of the bellows and the reservoir through which the oil must pass during periods of vibration. Conversely if the size of the orifice is increased there is a reduction of the damping action. It will be readily apparent that the effectiveness in damping will also vary with changes in the viscosity of the oil used. However, by proper adjustment of viscosity and calibration of the orifice 80 various desired degrees of damping may be obtained.

Figure 3 illustrates a modified type of valve which may be actuated by the bellows, and as shown, comprises a moveable valve member 90 having a profiled surface 92 adapted to cooperate with a fixed valve member 94 to control the flow of fluid between passages 96 and 98 of a carburetor 99. It is to be understood of course that any other desired type of valve may be used, or the arrangement may be used to actuate a switch or other device.

When pressure sensitive devices are used on aircraft it is sometimes desirable to use an arrangement such as is shown in Figure 4 which illustrates a device of this character embodying a modification of the present invention and providing means whereby the effectiveness of the damping means of the device is maintained when said device is tilted or inverted. As shown, the reservoir 12 is provided with a normally depending portion or chamber 110 which may be annular in shape although if desired a plurality of circumferentially spaced chambers may be used instead of the annular chamber. The reservoir is provided with a cylindrical portion 112 which extends axially therein and the bellows is secured to an end wall 114 which closes the interior end of the cylindrical portion, said wall 114 having a restricted orifice providing communication between the reservoir and the interior of the bellows. The bellows is filled with oil or other suitable liquid which also partly fills the reservoir. When the device is in its normal upright position the space 78, above the level of the liquid, is filled with gas and damping is effected in substantially the same manner as in the device shown in Figure 1. However, when the device is inverted the gas is trapped in the chamber 110 so that it cannot communicate with the orifice 116 and enter the bellows through said orifice. It is, of course, understood that the damping characteristics of the device would vary substantially should a gas pass through the orifice 116 instead of the liquid. Thus by preventing the gas in the reservoir from passing through the orifice 116 regardless of the position of the device, its damping characteristics are maintained substantially constant under various operating conditions which may be encountered.

It is thought that the invention and many of its attendant advantages will be understood from the foregoing description and that it will be apparent that various changes may be made in the form, construction and arrangement of the parts without departing from the spirit and scope of the invention or sacrificing all of its material advantages.

I claim:

1. In a pressure responsive device: a hollow resilient member adapted to be expanded and compressed in response to variations in pressure on opposite sides thereof; a reservoir joined to one end of said hollow member; a calibrated passage connecting the reservoir and the interior of the hollow member; and auxiliary fluid containing means disposed around said hollow member and communicating freely with said reservoir; liquid filling the hollow member and partially filling the reservoir; a gas above the level of the liquid in the reservoir, the quantity of liquid in said reservoir being such as to cover said passage in all positions of said device, whereby the gas will be trapped in the auxiliary portion of the reservoir upon inversion of the device.

2. In a pressure responsive device: comprising a partially evacuated reservoir having a bottom wall; a hollow resilient member attached to and depending from said wall and adapted to change its shape in response to variations in pressure on opposite sides thereof; liquid filling the hollow resilient member and also contained in the reservoir; a restricted passage through said wall connecting the reservoir and the interior of the hollow resilient member and adapted to materially delay the passage of liquid between the reservoir and hollow resilient member; and a recess in the wall of the reservoir having its bottom end tapered to the restricted passage to facilitate removal of gas from said hollow member.

3. The invention defined by claim 2 wherein there is a spring within the hollow resilient member having one end disposed in the recess of the reservoir wall and said spring is adapted to react between said reservoir wall and a portion of the hollow resilient member opposite said wall.

4. In a pressure responsive device: an enclosed reservoir having a depression therein; a bellows having one end thereof seated in said depression and sealed to said reservoir; a calibrated aperture connecting said reservoir with the interior of said bellows; a liquid filling said bellows and partially filling said reservoir; a gas above said liquid in the reservoir, the quantity of liquid being such as to cover said aperture in all positions of said device, whereby the gas is prevented from flowing through the aperture irrespective of the position of said pressure responsive device.

5. A pressure responsive device comprising a bellows; an enclosed reservoir disposed at one end of said bellows having a portion thereof extending along the side of said bellows; a calibrated aperture connecting said reservoir with the interior of said bellows; a liquid filling the bellows and partially filling the reservoir; a gas above the liquid in the reservoir, the quantity of liquid being such as to cover said aperture in all positions of said device, whereby the gas is prevented from flowing through the aperture irrespective of the position of said device.

6. A pressure responsive device comprising an enclosed cup-shaped reservoir; a hollow resilient member adapted to be expanded and compressed in response to variations in pressure on opposite sides thereof, one end of said member being seated in the recess formed by said cup-shaped reservoir and sealed thereto; a calibrated orifice between the reservoir and the interior of the resilient member; a liquid filling the resilient member and partially filling the reservoir; a gas above the liquid in the reservoir, the quantity of liquid being such as to cover said orifice in all positions of said device, whereby the gas is prevented from flowing through the orifice irrespective of the position of said device.

ALBERT H. WINKLER.

REFERENCES CITED

The following references are of record in the file of this patent:

UNITED STATES PATENTS

| Number | Name | Date |
| --- | --- | --- |
| 772,035 | Fulton | Oct. 11, 1904 |
| 904,123 | Fulton | Nov. 17, 1908 |
| 1,054,805 | Tillinghast | Mar. 4, 1913 |
| 1,143,380 | Gibson | June 15, 1915 |
| 1,515,810 | Giesler | Nov. 18, 1924 |
| 1,616,519 | Twombly | Feb. 8, 1927 |
| 1,662,289 | Whitehead | Mar. 13, 1928 |
| 1,802,848 | Summers | Apr. 28, 1931 |
| 1,999,697 | Kleckner | Apr. 30, 1935 |
| 2,035,512 | Smith | Mar. 31, 1936 |
| 2,040,762 | Spencer | May 12, 1936 |
| 2,297,231 | Lichte | Sept. 29, 1942 |
| 2,343,347 | Turner | Mar. 7, 1944 |
| 2,376,711 | Mock | May 22, 1945 |

FOREIGN PATENTS

| Number | Country | Date |
| --- | --- | --- |
| 18,482 | Great Britain | 1905 |
| 25,869 | Norway | 1915 |
| 669,539 | France | Aug. 5, 1929 |